T. N. EGERY.
Feed-Rolls for Saw-Mills.
No. 149,645. Patented April 14, 1874.
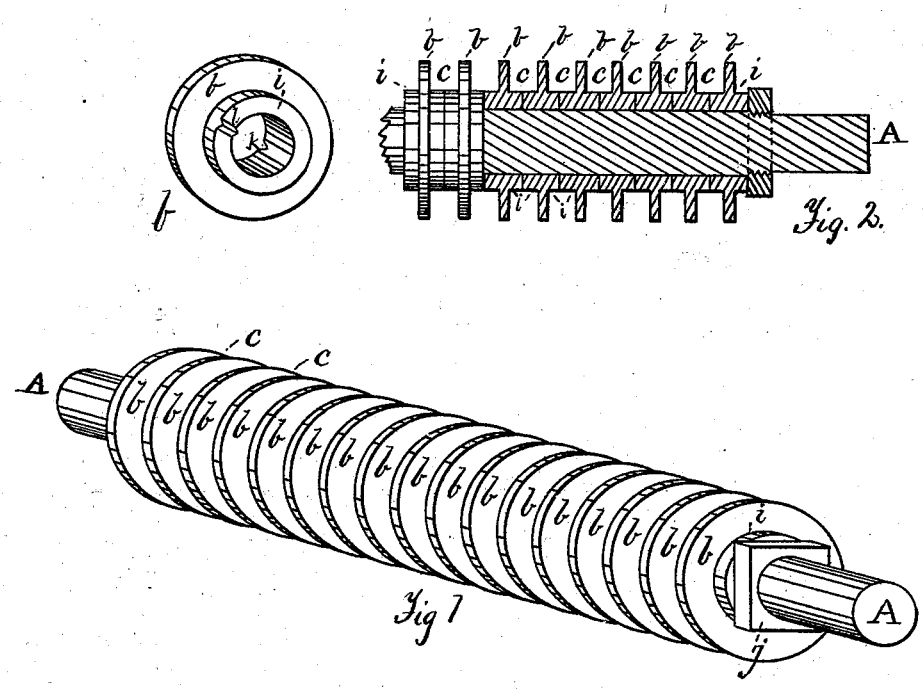

UNITED STATES PATENT OFFICE.

THOMAS N. EGERY, OF BANGOR, MAINE.

IMPROVEMENT IN FEED-ROLLS FOR SAW-MILLS.

Specification forming part of Letters Patent No. 149,645, dated April 14, 1874; application filed March 13, 1874.

*To all whom it may concern:*

Be it known that I, THOMAS N. EGERY, of Bangor, in the county of Penobscot and State of Maine, have invented certain new and useful Improvements in Feed-Rolls for Saw-Mills; and I do hereby declare that the following is a full, clear, and exact description thereof, that will enable others skilled in the art to which it appertains to make and use the same, reference being had to the accompanying drawings, and to the letters of reference marked thereon, which form a part of this specification, in which—

Figure 1 shows a perspective view of my roll; Fig. 2, an elevation, partially in section; detail $b$, a perspective of one wheel.

Same letters show like parts.

The object of my invention is to improve upon the feed-rolls now used upon edgers and similar machines for feeding lumber to the saws. When constructed solid, as is usual, these rolls prevent the operator from obtaining a clear view of the saws. My roll, on the contrary, allows the saws to be seen, which is frequently of much importance, and, moreover, is so constructed as to prevent all clogging from sawdust, &c., to which rolls with grooved or fluted surfaces are liable. It can also be very readily and cheaply repaired when worn or injured by accident. My roll consists of a shaft, upon which are mounted small wheels provided with hubs projecting from each side. These hubs come in contact with each other, and form a space between the sides of the wheels, which permits the saws to be easily seen, and also allows the roll to clear itself of sawdust. The peripheries of the wheels form the feeding-surface of the roll. A nut upon one end of the shaft enables the wheels to be tightly screwed together, so as to be stationary upon the shaft; or, if desired, one or more keys may be used.

Referring to the drawing, A shows the shaft; $b\ b$, the wheels, having the hubs $i$, thus forming the space $c$ between them. At $j$ is shown the nut holding them upon the shaft. If considered necessary, a tongue, $l$, may be cast upon the side of the hubs $i$, fitting a corresponding recess, A, in the adjoining hub, thus binding the wheels still more firmly together.

As will be seen, my roll can be very easily repaired, the wheels being interchangeable. When worn or injured in the center, where the greatest wear naturally comes, the center wheels may be moved out to the ends of the shaft and those at the ends substituted for them.

What I claim as my invention is—

A feed-roll for saw-mills, consisting of wheels $b$, provided with hubs $i$, having tongue $l$ and recesses $k$, corresponding thereto, mounted on a common shaft, A, and retained in place by a nut, $j$, at one end of said shaft, substantially as set forth.

In testimony that I claim the foregoing I have hereunto set my hand this 9th day of March, 1874.

THOMAS N. EGERY.

Witnesses:
 WM. FRANKLIN SEAVEY,
 SIMON H. RICHARDSON.